United States Patent [19]

Hibst et al.

[11] 4,401,643

[45] Aug. 30, 1983

[54] PREPARATION OF FINELY DIVIDED BARIUM FERRITE OF HIGH COERCIVITY

[75] Inventors: Hartmut Hibst, Ludwigshafen; Helmut Jakusch, Frankenthal, both of Fed. Rep. of Germany

[73] Assignee: BASF Aktiengesellschaft, Fed. Rep. of Germany

[21] Appl. No.: 313,180

[22] Filed: Oct. 20, 1981

[30] Foreign Application Priority Data

Nov. 14, 1980 [DE] Fed. Rep. of Germany ....... 3042959

[51] Int. Cl.$^3$ .............................................. C01G 49/00
[52] U.S. Cl. ..................................................... 423/594
[58] Field of Search ......................................... 423/594

[56] References Cited

U.S. PATENT DOCUMENTS

| 3,113,109 | 12/1963 | Brixner | 423/594 |
| 3,582,266 | 6/1971 | Sopp et al. | 423/594 |
| 3,634,254 | 1/1972 | Micheli | 252/62.63 |
| 3,793,443 | 2/1974 | Arendt | 423/594 |
| 3,810,973 | 5/1974 | Arendt et al. | 423/594 |
| 4,120,807 | 10/1978 | Watanabe et al. | 252/62.62 |
| 4,289,745 | 9/1981 | Patel | 423/594 |

FOREIGN PATENT DOCUMENTS

| 2832892 | 2/1980 | Fed. Rep. of Germany . | |
| 46-3545 | 10/1965 | Japan | 423/594 |
| 1317088 | 5/1973 | United Kingdom . | |

OTHER PUBLICATIONS

K. Haneda et al., J. of the Amer. Ceramic Soc. 57 (8), (1974), pp. 354–357.

Primary Examiner—Herbert T. Carter
Attorney, Agent, or Firm—Keil & Witherspoon

[57] ABSTRACT

A process for the preparation of barium ferrite of the formula $BaFe_{12}O_{19}$ by reacting an aqueous solution or suspension of a barium salt and an aqueous solution of an iron(III) salt with an aqueous sodium carbonate solution, removing the solvent, heating the dry salt mixture to below the melting point of the sodium salt present, but to not less than 680° C., and isolating the resulting finely divided, platelet-like barium ferrite from the barium ferrite/sodium salt mixture by leaching with water.

3 Claims, No Drawings

PREPARATION OF FINELY DIVIDED BARIUM FERRITE OF HIGH COERCIVITY

The present invention relates to a process for the preparation of easily dispersible hexagonal barium ferrite of high coercivity, having a particle size of less than 0.2 μm, a specific surface area, measured by the BET method ($SN_2$) of not less than 10 m$^2$/g, and a field strength distribution ($h_{25}$) of less than 0.3.

The ferrite powders employed for the production of magnetically hard ferrite magnets and of substantially counterfeit-proof magnetic recordings are usually prepared by a ceramic process. For this purpose, barium carbonate or strontium carbonate and iron oxide are mixed in a ratio which corresponds to the chemical formula of the ferrite to be produced, and the mixture is heated, ie. pre-sintered, at from 1,100° C. to 1,300° C. On presintering, the magnetic hexaferrite is formed. The sintered crystallite agglomerates formed are then milled, generally in the presence of water, to give a powder of a particle size of about 1 μm. The milling creates crystal defects in the particles, which reduce the coercivity. Ferrite powders produced in this way generally have very good specific remanence, but the coercive force $_jH_c$ is very low, being about 200 kA/m before milling and ≦150 kA/m after milling. These crystal defects caused by milling can be only partially repaired by heating after milling, or by a sintering process. Consequently, the magnets which are produced from milled magnetically hard barium ferrite powder and which are used in industry at the present time have $_jH_c$ values of only from 280 to 320 kA/m. Furthermore, the milled ferrite powders exhibit a broad particle size spectrum, so that the magnetic recording media produced with correspondingly obtained BaFe$_{12}$O$_{19}$ powders exhibit a field strength distribution ($h_{25}$) of more than 0.4.

An alternative process is described, for example, in German Laid-Open Application DOS No. 2,832,892. In this, a Ba-Fe(III) nitrate solution is sprayed, in a tower, in counter-current to a heating gas at 1,200° C. It is a disadvantage of the process that the Ba ferrite powder obtained is contaminated with α-Fe$_2$O$_3$, thereby reducing the saturation magnetization and residual magnetization compared to one-phase ferrite. Furthermore, the crystallites obtained are partially sintered together, so that before further use the powder must be milled.

In addition to the above processes, co-precipitation processes have also been employed to prepare barium ferrites and strontium ferrites. Thus, K. Haneda et al., J. Amer. Ceram. Soc. 57 (8) (1974), 354-7, describe the preparation of barium ferrite of high coercivity by heating a filtered-off, washed and dried BaCO$_3$/Fe(OH)$_3$ coprecipitate at 925° C. The co-precipitate is prepared by mixing a Ba-Fe(III) chloride solution and an NaOH/Na$_2$CO$_3$ solution, using an almost 4-fold excess of alkali. Another co-precipitation process starting from Ba-Fe(III) chloride solution and excess Na$_2$CO$_3$ solution is disclosed in German Laid-Open Application DOS No. 1,948,114 (U.S. Pat. No. 3,582,266). The co-precipitate of Ba carbonate and Fe(III) carbonate is filtered off, washed, spray-dried and heated at 1,100° C. The excess Na$_2$CO$_3$ enables salt constituents to be effectively removed after filtration. However, the high temperature required for the heat treatment results in coarse ferrite powders, having particle sizes of 0.5-1.0 μm and $H_c$ values which are also attainable by a ceramic process. A further co-precipitation process is known from British Pat. No. 1,254,390 (U.S. Pat. No. 3,634,254). This starts from an ammoniacal Ba-Fe(III) nitrate solution, the cations being precipitated with an ammonium salt of a fatty acid. Here again, a heat treatment is required, with its consequent adverse effects on the particle size spectrum.

The above processes have the disadvantage that the co-precipitate produced in a liquid phase is too fine and accordingly very difficult to separate from the liquid phase. Since, furthermore, the precipitated finely divided Ba salt in part runs through the filter, it is difficult to obtain precipitated products of a composition corresponding to the specified molar ratios of the particular components. Because of these shortcomings, these processes have hitherto not been operated industrially. They have the further disadvantage that the ferrites obtained are difficult to disperse, because they have sintered during heating, and must be milled before they can be further used.

In order to overcome the disadvantage of poor filtrability, German Published Application DAS No. 2,738,830 (U.S. Pat. No. 4,120,807) proposes producing a coarse Fe$_3$O$_4$ and BaCO$_3$, of a particle size of 0.5-0.7 μm, by co-precipitation. The Ba ferrite obtained after heating at from 400° to 900° C. has a crystallite diameter of 0.5-0.9 μm and is thus relatively coarse and, in part, is obtained in sintered form.

Co-precipitations in general bring about intimate contact between the reactants and thus accelerate the reaction. However, flux processes are also known, in which fluxes, for example B$_2$O$_3$, alkali metal borates, PbO, alkali metal ferrites, Bi$_2$O$_3$, molybdates, alkali metal halides and alkali metal sulfates, are employed to promote the reaction between the individual metal oxides. Thus, according to U.S. Pat. No. 3,793,443, barium ferrite is prepared by heating a BaCO$_3$/FeOOH/NaCl/KCl mixture. This publication considers that it is important to start from FeOOH as the iron component, in order to effect the ferrite formation in the presence of H$_2$O produced in situ. Furthermore, complete ferrite formation is observed only above the melting point of the added alkali metal chlorides (ie. at about 1,000° C.); lower temperatures give low yields of Ba ferrite. The process offers no improvement over the ceramic method in respect of the coercive force that can be achieved. Furthermore, the particles have a crystallite diameter of about 1-1.5 μm, ie. they are relatively coarse. According to German Laid-Open Application DOS No. 2,401,029 (U.S. Pat. No. 3,810,973), a suspension of iron(III) oxide hydroxide in an alkali metal chloride solution is mixed with BaCO$_3$ powder and the mixture is then spray-dried and heated at 1,000°-1,050° C. The process gives a relatively coarse hexagonal ferrite having crystallite diameters of about 1-1.5 μm and $H_c$ values of 4,800-5,400 Oe. German Laid-Open Application DOS No. 2,143,793 describes a process for the preparation of barium ferrite in which a BaCO$_3$/Fe$_2$O$_3$/Na$_2$SO$_4$/K$_2$SO$_4$ mixture is heated at 900°-950° C., since at this reaction temperature the alkali metal sulfates present fuse so as to form a liquid phase for rapid transport of the iron compound and barium compound which react with one another.

The alkali metal chloride and alkali metal sulfate flux processes described give salt/ferrite mixtures, from which the salt is subsequently dissolved by suspending the product in water, so that the ferrite can be isolated. The salt/ferrite products are obtained as compact, solid and hard melt cakes of relatively small surface area, and unless these are comminuted, the salt content will dissolve only slowly on treatment with water. Further, it is a disadvantage that the processes require high temperatures, namely 950°–1,050° C.

It is an object of the present invention to provide a process for the preparation of hexagonal ferrites which substantially avoids the disadvantages described and gives a barium ferrite which in particular meets the demands made on a magnetic material for use in magnetic recording media. Such a barium ferrite is in particular required to have good dispersibility, for incorporation into organic binders, fine particles coupled with a narrow particle size distribution, a very high coercive force and a narrow field strength distribution.

We have found that this object is achieved and that, surprisingly, a barium ferrite of the formula $BaFe_{12}O_{19}$, having the required properties, can be prepared in a simple manner if an aqueous solution or suspension of a barium salt and an aqueous solution of an iron(III) salt are reacted with an aqueous sodium carbonate solution, the resulting mixture, consisting of sparingly soluble barium salt and iron(III) carbonate, in a sodium salt solution, is brought to dryness, the dry salt mixture is then heated at a temperature below the melting point of the sodium salt present, but not less than 680° C., and the resulting finely divided, platelet-like barium ferrite is then isolated from the barium ferrite/sodium salt mixture by leaching with water.

It has proved advantageous to carry out the process according to the invention with barium as the chloride, sulfate or carbonate and iron as the chloride or sulfate, so that the sodium salt component formed is sodium chloride or sodium sulfate.

If barium chloride and iron chloride are used as starting materials, an aqueous $BaCl_2/FeCl_3$ solution, having a gram-atom ratio of iron to barium of 10–12:1, especially 11.0–11.5:1, is introduced into a stirred aqueous $Na_2CO_3$ solution. The concentration of the $Na_2CO_3$ solution is chosen to give a gram-atom ratio of sodium to chloride ions of 1.0–1.3:1, especially 1.0–1.2:1, in the reaction mixture. After combination of the solutions, a suspension of X-ray-amorphous barium carbonate and iron(III) carbonate in a sodium chloride solution is obtained. This suspension is spray-dried and the resulting powder, consisting of barium carbonate, iron(III) carbonate and sodium chloride is heated for from 0.5 to 3 hours at from 680° to at most 800° C., especially from 730° to 770° C. This gives a barium ferrite/sodium chloride mixture as a loose powder which can easily be broken down by rubbing between the fingers. On suspension in water, the non-comminuted powder is immediately wetted thoroughly, so that the sodium chloride component quickly dissolves. A pale brown barium ferrite product remains, which can readily be filtered off and washed with water. It sometimes contains, in addition to the barium ferrite phase, small amounts of barium carbonate which can however easily be removed during the aqueous treatment of the ferrite/sodium chloride mixture by adding a small amount of acid, for example acetic acid.

The process according to the invention can similarly be carried out with barium carbonate or sulfate and iron(III) sulfate. In that case, a suspension of barium carbonate or barium sulfate in an aqueous sodium carbonate solution is used as starting material, and an iron(III) sulfate solution is introduced into it. The gram-atom ratios are similar to those given earlier, namely iron:barium = 10–12:1 especially 11.0–11.5:1, and sodium:sulfate ion = 2.0–2.6:1, especially 2.0–2.4:1. The resulting reaction solution is spray-dried and the powder, containing $BaCO_3$ or $BaSO_4$, iron(III) carbonate and sodium sulfate, is heated for from 0.5 to 3 hours at from 680° to at most 880° C., especially at from 730° to 840° C. This gives a Ba ferrite/$Na_2SO_4$ mixture in the form of a loose, bulky powder, which can easily be broken down by rubbing between the fingers. When suspended in water, the non-comminuted product is immediately wetted through, so that the $Na_2SO_4$ constituent dissolves rapidly. A pale brown barium ferrite product remains, which, if an excess of barium has been used, may be slightly contaminated with $BaSO_4$. However, the $BaSO_4$ component is generally so fine that a large proportion of it runs through the filter during the subsequent filtration. Magnetic separation is also feasible.

In each case, the process according to the invention gives a fine, non-sintered barium ferrite powder which can easily be broken down by rubbing between the fingers and does not require milling for further processing. The product consists of small platelets having a narrow particle size distribution and a platelet diameter of 0.1–0.2 μm. The specific surface area is from 10 to 25 $m^2/g$, depending on the heating conditions employed. The coercive force is found to be from 400 to 460 kA/m, the specific remanence being from 35 to 39 $nTm^3/g$. The field strength distribution, expressed in terms of the $h_{25}$ value, is from 0.2 to 0.3. The $h_{25}$ value used to characterize the field strength distribution is deduced from the d.c. demagnetization curve (remanence curve) of a powder or of a magnetic tape. After magnetic saturation of the sample, the magnetic field strengths, which, after applying and switching off the field, have reversed the magnetization of 25, 50 and 75% of the magnetic particles are determined. If these field strengths are respectively designated $H_{25}$, $H_{50}$ and $H_{75}$, then $$h_{25} = (H_{75} - H_{25})/H_{50}.$$

A narrow field strength distribution manifests itself in a low $h_{25}$ value.

Further, the process according to the invention is, in a number of respects, technically simpler than the conventional co-precipitation processes or flux processes for obtaining barium ferrite. For example, the lengthy filtration of the co-precipitates is dispensed with, and the predetermined Fe/Ba ratio is preserved, since no Ba component is lost through the filter. Further, it is not necessary to set and control the pH, since the pH is predetermined by the solutions employed and does not have to be changed. Moreover, the use of expensive NaCl/KCl or $Na_2SO_4/K_2SO_4$ mixtures as fluxes can be dispensed with.

An important advantage of the process according to the invention is that heating is carried out at distinctly lower temperatures, in each case at below the melting point of the sodium salt present. Accordingly, heating the salt/ferrite mixture does not give a hard melt cake which must be milled before further processing and which is only slowly attacked by water; instead, the salt/ferrite powder is easily broken down by rubbing between the fingers and the salt component is rapidly dissolved out with water. Consequently, the barium ferrite powders obtainable according to the invention are extremely finely divided and also have a very narrow particle size distribution, and this results not only in good magnetic properties, as already stated, but also in improved dispersibility.

Because of the particularly good dispersibility of the barium ferrite powders obtainable in the manner described, the products are particularly useful as magnetic materials for the production of magnetic recording media. In this application, the ferrite powder exhibits better magnetic properties than conventional products. Furthermore, the barium ferrite powder prepared according to the invention is so finely divided that the magnetic layers prepared therewith have an outstandingly smooth surface even when they are very thin. When the novel barium ferrite powders are used in magnetic recording media, the coercive force is increased by about 20 kA/m, so that magnetic recording media with very high $H_c$ values, namely from 420 to 480 kA/m, can be produced. Because of this high $H_c$, it is difficult to alter a magnetic recording, once it has been made. Moreover, this makes the magnetic recordings substantially insensitive to stray fields, and, to a certain extent, counterfeit-proof.

The Examples which follow illustrate the invention.

EXAMPLE 1

A Solution A consisting of 139.6 g of $BaCl_2.2H_2O$ and 1,776.4 g of $FeCl_3.6H_2O$ in 8 liters of water is prepared and introduced into a stirred solution of 1,105.5 g of $Na_2CO_3$ in 11 liters of water. The pH of the mixture is 5.5. The suspension obtained is then spray-dried. Thereafter, the spray-dried powder is heated for one hour at 750° C. in air in a box furnace which has been preheated to this temperature. After cooling, a $BaFe_{12}O_{19}/NaCl$ mixture is obtained, which can easily be broken down by rubbing between the fingers. This mixture is introduced into cold water, with stirring, whereupon the NaCl constituent of the mixture rapidly dissolves. The brown ferrite is then filtered off, washed and dried. The $BaFe_{12}O_{19}$ product, which in an X-ray diagram shows only one phase, consists of crystal platelets having a narrow size spectrum, a platelet diameter of 0.1–0.2 μm and a specific surface area of 12.8 m²/g. The magnetic properties are as follows: $H_c$=417 kA/m, $M_r/\rho$=38 nTm³/g, $h_{25}$ value=0.21.

EXAMPLE 2

A Solution A, as used in Example 1, is introduced into a stirred solution of 1,326.6 g of $Na_2CO_3$ in 12 liters of water. The pH of the mixture is 6.9. The further processing of the resulting suspension is as described in Example 1. The barium ferrite product obtained has a platelet diameter of 0.1–0.2 μm and a specific surface area of 18.2 m²/g. The magnetic properties are as follows: $H_c$=465 kA/m, $M_r/\rho$=35 nTm³/g, $h_{25}$=0.19.

EXAMPLE 3

233.4 g of $BaSO_4$ are dispersed in a solution of 2,040.3 g of $Na_2CO_3$ in 7 liters of water by means of a high-speed stirrer; this mixture is Dispersion A. In addition, a solution (Solution B) of 2,730.3 g of $Fe_2(SO_4)_3.5.36H_2O$ in 18 liters of water is prepared. Solution B is then introduced into stirred Dispersion A and the suspension obtained is spray-dried. The spray-dried powder is subsequently heated for 1 hour in air at 830° C. in a box furnace preheated to this temperature. After cooling, a $BaFe_{12}O_{19}/Na_2SO_4$ mixture is obtained, which can easily be broken down by rubbing between the fingers. This mixture is stirred into cold water, whereupon the $Na_2SO_4$ component rapidly dissolves. The brown ferrite is then filtered off, washed and dried. The X-ray diagram shows that the product is $BaFe_{12}O_{19}$ contaminated with small amounts of $BaSO_4$. The magnetic properties are as follows: $H_c$=420 kA/m, $Mr/\rho$=39 nTm³/g. The field strength distribution is 0.24. The product consists of crystal platelets having a diameter of 0.1–0.2 μm and a specific surface area $S_{N_2}$ of 12.7 m²/g.

EXAMPLE 4

197.4 g of $BaCO_3$ are dispersed in 2 liters of water, using a high-speed stirrer. In addition, the following two solutions are prepared:

Solution A: 2,040.3 g of $Na_2CO_3$ in 7 liters of water, and
Solution B: 2,730,3 g of $Fe_2(SO_4)_3 \times 5.36H_2O$ in 18 liters of water.

Thereafter, Solution A is introduced into stirred Solution B, and the $BaCO_3$ dispersion is then added. The aqueous solution obtained is further treated as described in Example 3.

The barium ferrite product obtained has a platelet diameter of 0.1 to 0.2 μm and a specific surface area of 14.2 m²/g; its magnetic properties are as follows:

$H_c$=410 kA/m, $M_2/\rho$=38 nTm³/g. The field strength distribution $H_{25}$ is 0.24.

EXAMPLE 5

400 Parts of a barium ferrite powder prepared as described in Example 1, with $H_c$=420 kA/m, 100 parts of a 20% strength solution of a copolymer of 80 parts of vinyl chloride, 10 parts of dimethyl maleate and 10 parts of diethyl maleate in a mixture of equal parts of tetrahydrofuran and dioxane, 103 parts of a 13% strength solution of a thermoplastic polyester-urethane obtained from adipic acid, 1,4-butanediol and 4,4'-diisocyanatodiphenylmethane, in a mixture of equal parts of tetrahydrofuran and dioxane, 24 parts of a commercial anionic wetting agent based on phosphoric acid esters and 231 parts of the solvent mixture mentioned are mixed and dispersed for 6 hours in a vibratory ball mill, using steel balls of 2 mm diameter. 199 parts of the 13% strength solution, mentioned above, of a thermoplastic polyester-urethane obtained from adipic acid, 1,4-butanediol and 4,4'-diisocyanatodiphenylmethane in a mixture of equal parts of tetrahydrofuran and dioxane, 35 parts of the solvent mixture mentioned, 0.3 part of stearic acid, 0.3 part of a commercial silicone oil and 0.6 part of hydroquinone are added and dispersion is continued for 2 hours. The dispersion obtained is then filtered and applied in a conventional manner to a 6 μm thick polyethylene terephthalate film, in such an amount that, after orienting the platelet-like particles by passing the coated film through a magnetic field, and then drying the coating and calendering the coated film, a 7.1 μm thick magnetic layer is obtained.

The magnetic tape has the following properties: $H_c$=443 kA/m, $M_r$=70 mT, $M_s$=106 mT, orientation ratio=1.2, $h_{25}$=0.18.

We claim:

1. A process for the preparation of barium ferrite of the formula $BaFe_{12}Fe_{19}$ which comprises:
   (a) mixing an aqueous solution of a barium compound selected from the group consisting of barium chloride, barium sulfate and barium carbonate with an aqueous solution or an iron(III) compound selected from the group consisting of iron(III) chloride and iron(III) sulfate;

(b) reacting the mixture formed in step (a) with an aqueous sodium carbonate solution;

(c) completely dehydrating the resulting mixture from step (b) which consists essentially of sparingly soluble barium compound and iron(III) carbonate in an aqueous sodium salt solution;

(d) heating the dry salt mixture from step (c) at a temperature above 680° C. but below the melting point of the sodium salt present; and (e) leaching the resulting product with water to dissolve the sodium salt and to isolate the finely divided, platelet-like barium ferrite.

2. The process of claim 1, wherein barium chloride and iron(III) chloride are employed, so that sodium chloride is formed as the sodium salt component, and heating is effected at from 680° to 800° C.

3. The process of claim 1, wherein $BaCO_3$ or $BaSO_4$ and iron(III) sulfate are employed, so that sodium sulfate is formed as the sodium salt component, and heating is effected at from 680° to 880° C.

* * * * *

UNITED STATES PATENT AND TRADEMARK OFFICE
CERTIFICATE OF CORRECTION

PATENT NO. : 4,401,643
DATED : August 30, 1983
INVENTOR(S) : Hartmut HIBST et al.

It is certified that error appears in the above-identified patent and that said Letters Patent is hereby corrected as shown below:

IN THE CLAIMS

Claim 1, line 2, change "$BaFe_{12}Fe_{19}$" to --$BaFe_{12}O_{19}$--.

Signed and Sealed this

Seventh Day of August 1984

[SEAL]

Attest:

Attesting Officer

GERALD J. MOSSINGHOFF
Commissioner of Patents and Trademarks